United States Patent [19]
Johnson

[11] Patent Number: 5,150,760
[45] Date of Patent: Sep. 29, 1992

[54] AUTOMATED CURBSIDE CHECK-IN COUNTER

[76] Inventor: James A. Johnson, 2012 Goldenrod La., Arlington, Tex. 76013

[21] Appl. No.: 803,985

[22] Filed: Dec. 9, 1991

[51] Int. Cl.⁵ ............................................. G01G 19/00
[52] U.S. Cl. ......................................... 177/245; 177/2; 177/136; D34/14
[58] Field of Search ........................................ 177/2–4, 177/136, 245

[56] References Cited

U.S. PATENT DOCUMENTS

| | | | |
|---|---|---|---|
| 4,225,926 | 9/1980 | Wendt | 177/136 X |
| 4,239,434 | 12/1980 | Gannon | 177/4 X |

*Primary Examiner*—George H. Miller, Jr.
*Attorney, Agent, or Firm*—Terry M. Gernstein

[57] ABSTRACT

A curbside check-in counter includes a cabinet unit that can be moved from place to place in a transportation terminal while still retaining features that permit a passenger to complete his or her check-in procedure in a manner similar to that carried out at a main check-in position. The check-in counter has a scale unit that is connected to a computer in the unit so baggage can be weighed, and any excess baggage charges noted and assessed. The scale unit can be stored beneath the check-in counter when not in use. The check-in counter further includes compartments for a printer as well as displays for flight information. The cabinet unit further includes compartments for heating and air conditioning systems, as well as trash bins, cash drawers, control panel compartments, and compartments for other units associated with the counter.

28 Claims, 9 Drawing Sheets

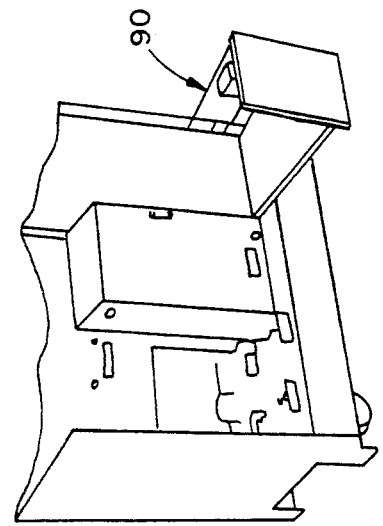
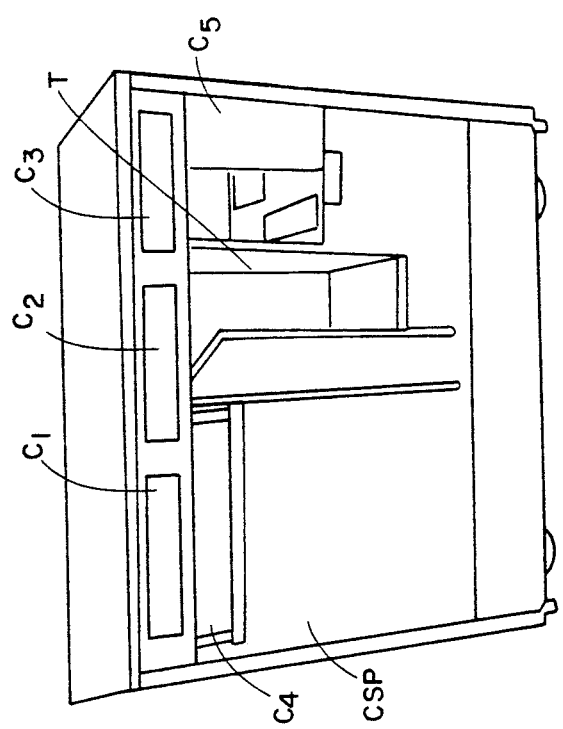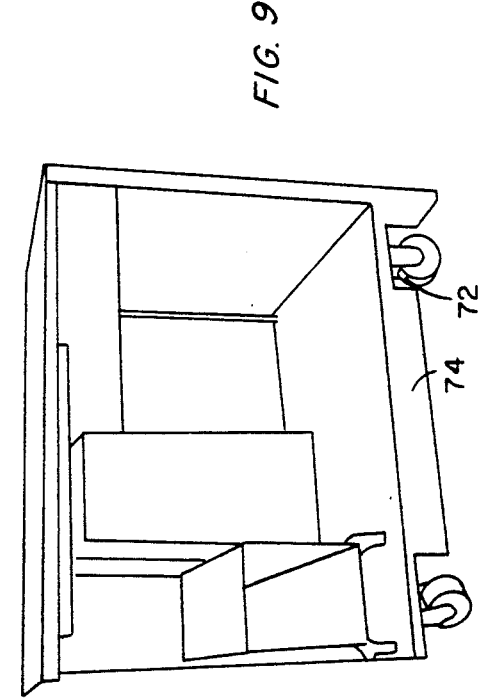

AUTOMATED CURBSIDE CHECK-IN COUNTER

TECHNICAL FIELD OF THE INVENTION

The present invention relates to the general art of multipurpose furniture, and to the particular field of multipurpose cabinets.

BACKGROUND OF THE INVENTION

Many travelers have experienced the frustration of long lines at a passenger check-in position. This frustration can be further exacerbated if the passenger must then face a long check-in line at the departure location. As the travel and transportation industry searches for areas to economize, some check-in lines may be worsened as flights are reduced at airports, trains are reduced at train stations, buses reduced at bus stations, and the like.

In an effort to speed up check in, many carriers, especially the airlines, locate remote check-in units at various positions throughout the terminal building. One such remote unit is a curbside check-in counter found at many airports. A passenger can check his or her baggage in at such curbside check-in counters. While successful, these curbside check-in counters have some disadvantages that are emphasized if long lines are forming at both the curbside check-in counter and at the main check-in positions.

For example, up-to-the minute information regarding departures, locations of departures and the like may not be readily available at such curbside check-in counters. Still further, if a passenger wants to change his or her ticket, such change may be difficult to effect at a curbside check-in counter. A further problem with presently available curbside check-in counters is that they are not very mobile. Once set up, it is extremely difficult to move a curbside check-in counter to another location. Thus, if, for example, there is a bottleneck at one location causing a long line, while another location is nearly devoid of passengers, it is difficult for any curbside check-in counter to be moved from the second position to the first position to relieve the congestion at the first location. This is especially true if the counter must be moved from outside a terminal building to inside the terminal building.

While the above-mentioned problems are troublesome, there is another problem with presently available curbside check-in counters that is critical. This problem is associated with the inability of such presently available curbside check-in counters to asses and charge for a passenger's excess baggage. As baggage represents fuel costs, especially for airlines, failure to assess charges for excess baggage represents lost revenue to the airline. With fuel costs extremely high, such lost revenue can be a critical factor in the profitability, and even viability, of a carrier, especially an airline.

Each passenger is allotted a certain amount of baggage weight, and ticket prices are set to account for the fuel associated with this weight. However, when a passenger has more than that allotted weight, the carrier loses money on the fuel.

However, presently available curbside check-in counters do not have a capability of efficeintly weighing a passenger's baggage, and do not have the ability to readily assess an excess baggage charge if applicable. In fact, at high use times, many ticket agents, even at the main ticketing locations, do not assess excess baggage charges as such charging may take too long.

Another problem with presently available curbside check-in counters arises because they are not connected to a main computer for the carrier. Thus, an action occurring at a curbside check-in counter may not be accounted for by an agent at a main check-in position. Therefore, many curbside check-in counters simply do not have the capability to perform certain tasks, such as ticketing, that would affect actions elsewhere in the terminal building.

Therefore, there is a need for a portable, multipurpose unit that can be used for curbside check-in at a terminal station. The unit should have the capability of communicating with a main computer in the terminal station, yet should be amenable to easy movement from one place to another, even from outside the building into the inside of the building. The unit should also have the capability of quickly assessing and charging for excess baggage that a passenger may have.

OBJECTS OF THE INVENTION

It is a main object of the present invention to provide a portable, multipurpose unit that can be used for curbside check-in at a terminal station.

It is another object of the present invention to provide a portable, multipurpose unit that can be used for curbside check-in at a terminal station, yet is amenable to easy movement from one place to another, even from outside a terminal building into the inside of the building.

It is another object of the present invention to provide a portable, multipurpose unit that can be used for curbside check-in at a terminal station that has the capability of quickly assessing and charging for excess baggage that a passenger may have.

It is a more specific object of the present invention to provide a portable, multipurpose unit that can be used for curbside check-in at an airport.

It is a more specific object of the present invention to provide a portable, multipurpose unit that can be used for curbside check-in at an airport, and has the capability of permitting tickets and baggage claim checks to be written and/or changed at that curbside check-in counter.

SUMMARY OF THE INVENTION

These, and other, objects are achieved by a portable, multipurpose curbside check-in counter that can be used at any terminal, such as an airport terminal, a bus terminal, a train terminal or the like. The counter includes a computer that can be connected to the main computer in the terminal whereby any transactions that can be carried out at a main check-in location can also be carried out at the curbside counter. For example, tickets can be written and/or changed at the counter in a manner identical to that occurring at the main ticketing locations inside the terminal.

Still further, the counter includes a scale connected to the computer and to a printer. A passenger's baggage can be weighed at the curbside check-in counter, and any excess baggage weight can be charged to the passenger. The counter includes a printer and means for charging the excess baggage charge to the passenger's credit card, if desired. The counter also includes visual readouts so both the agent and the passenger can see the baggage weights. The scale can be stored beneath the counter cabinet when not in use, and includes a special handle that is releasably attached to the scale. The handle can also be used to steer the overall unit during movement of the unit.

The counter also includes means for printing baggage claim tags. This claim tag printing means can include means for coding the ticket as well as the claim tag, with the preferred means including a bar code. A two piece metal security device attached to the top work surface of the cabinet locks the weatherproof keyboard in place. The keyboard is used to control the computer as well as the other functions of the counter. The security device prevents the keyboard from being inadvertently separated from the cabinet.

The counter is supported on wheels to be easily moved from one location to another as the need arises. This permits the counter to be moved where it will be most effective. Because it is connected to the main computer, no matter where the counter is located, it will be able to function as a main ticket location.

Not only will the counter be effective in relieving congestion, it will permit a carrier to assess charges that are now foregone because there is no effective means for assessing charges such as excess baggage charges.

A motion sensor is also mounted on the cabinet. The motion sensor is connected to an alarm, with the alarm being audible in the preferred form of the cabinet. If the cabinet is moved without unplugging the systems from the main systems, such as the main computer system, the alarm will be activated. This will prevent damage to the cabinet or to equipment in the cabinet due to improper movement of the cabinet.

BRIEF DESCRIPTION OF THE DRAWING FIGURES

FIG. 7 illustrates the counter in the open condition as seen from the agent's side.

FIG. 8 illustrates the unit in the open condition with the heating and air conditioning unit in place.

FIG. 9 is an elevational view showing the curbside counter from the passenger's side, with the panel removed.

Figure 15:
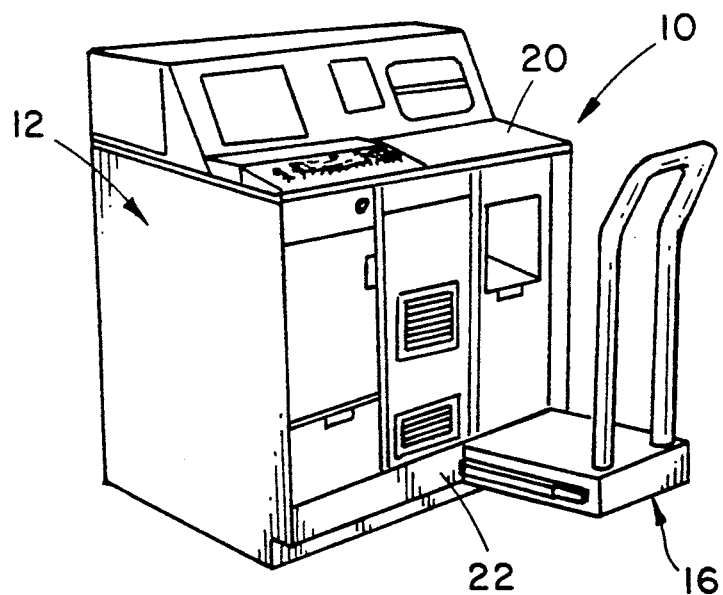

FIG. 15 llustrates another form of the curbside check-in counter in which the scale mechanism is located on the rear side thereof.

DETAILED DESCRIPTION OF THE PREFERRED EMBODIMENT OF THE INVENTION

Figure 4:
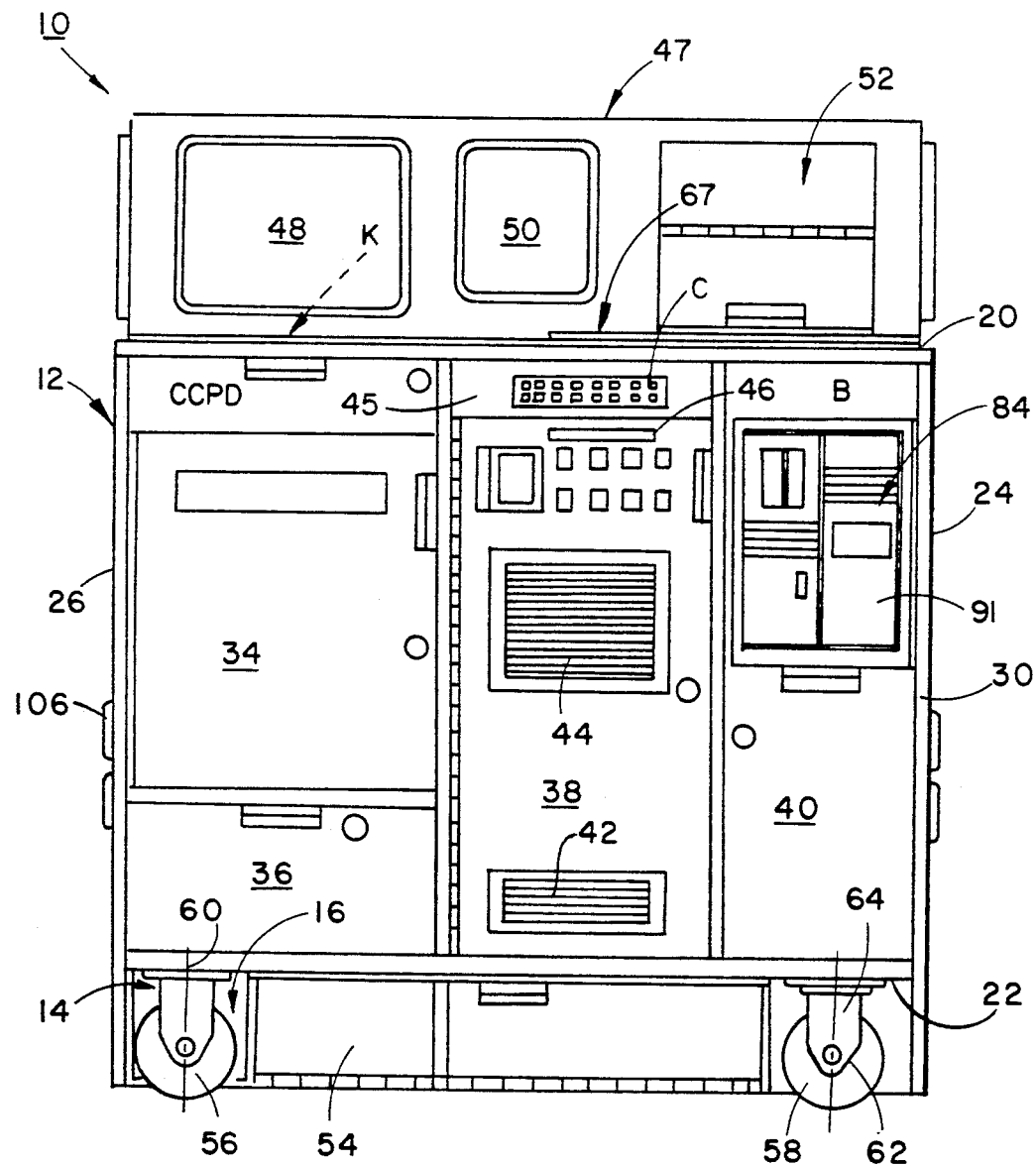
FIG. 4 is a front elevational view of the curbside check-in counter as seen from the agent's side.
Figure 6:
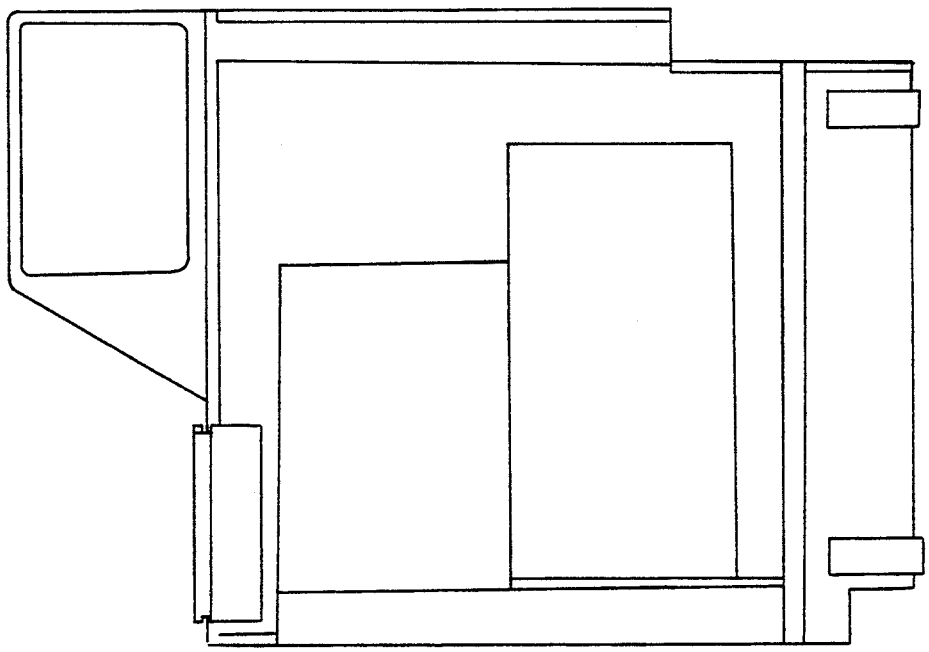
FIG. 6 is an end elevational view of the curbside check-in counter.
Figure 5:
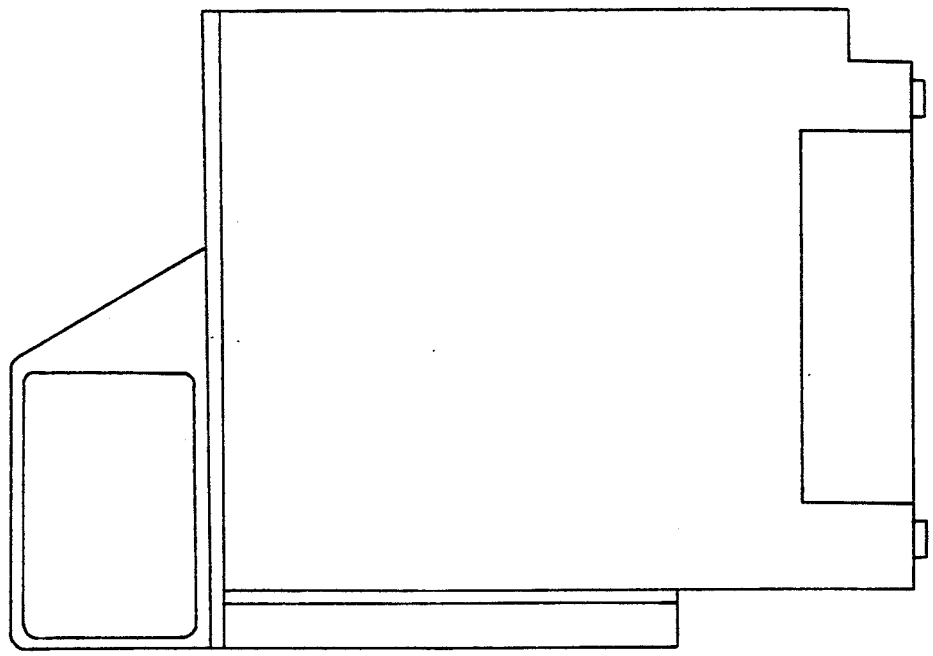
FIG. 5 is an end elevational view of the curbside check-in counter.

Shown in FIGS. 1-6 is a curbside check-in counter 10 that includes a cabinet unit 12 supported on a wheel unit 14. The counter 10 further includes a scale unit 16 that is attached to the cabinet unit by rollers sliding on rails that are pendently attached to the cabinet unit. The scale unit 16 moves between the use position shown in FIG. 1 to a stored position beneath the cabinet unit as indicated in FIG. 4. The curbside check-in counter 10 can be formed of various materials. However, the preferred materials include materials such as plastics-type materials, metal, fiberglass-type materials and the like that will not be damaged by exposure to weather.

The cabinet unit includes a top 20, a bottom 22, a first side 24, a second side 26 a front 28 that will be adjacent to a passenger, and a rear 30 that will be adjacent to an agent when the counter is in use.

Figure 11:
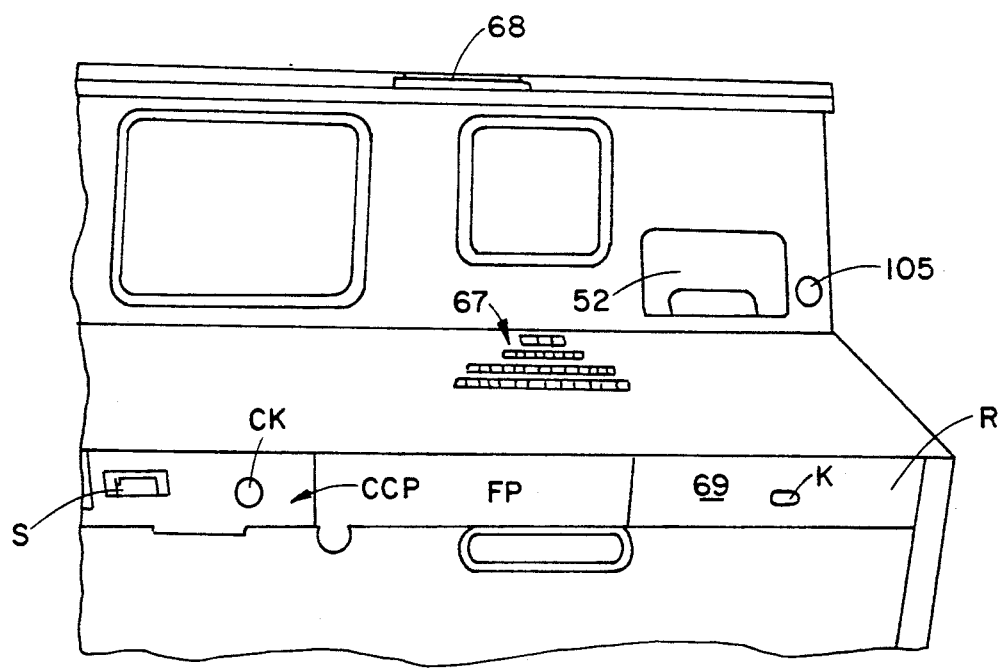
FIG. 11 illustrates the top of the check-in counter from the agent's side.

The rear 30 includes a plurality of doors 34, 36, 38 and 40, with door 38 having ventilation louvers 42 and 44 thereon. The doors provide access to various compartments inside the cabinet as will be discussed below. A flight information control panel 45 and a trash slot 46 are also shown in FIG. 4. A turret 47 is mounted on top of the cabinet and houses various data displays, with non-glare windows 48 and 50 being located in the turret to face an agent processing a passenger. A hinged compartment door 52 is also located on the turret. The flight information control panel includes control and access knobs C, and controls the display of flight information on a display located behind window 50. However, if the flight information feature is not desired, a blank filler plate FP shown in FIG. 11, is mounted on the cabinet unit. The trash slot co-operates with a trash bin T located inside the cabinet. A cabinet control panel CCP is mounted on the cabinet as shown in FIG. 11. This control panel includes an on/off switch S, as well as other control knobs CK for controlling various functions of the check-in counter. The control panel CCP can be covered by a door CCPD as shown in FIG. 4. The panels are mounted in compartments shown in FIG. 7 as compartments $C_1$, $C_2$ and $C_3$ respectively. An LED can be mounted on the control panel to indicate interior cabinet temperature.

A kickplate 54 is attached to the cabinet unit between wheels 56 and 58 of the wheel unit 14. The wheels 56 and 58 function in the manner of casters in that they swivel about longitudinal centerlines, such as centerline 60 for wheel 56 as well as rotate about axles, such as axle 62 of wheel 58 connected to a support arm, such as support arm 64 of wheel 58. The wheel unit 14 permits the counter to be moved from place to place.

Figure 1:
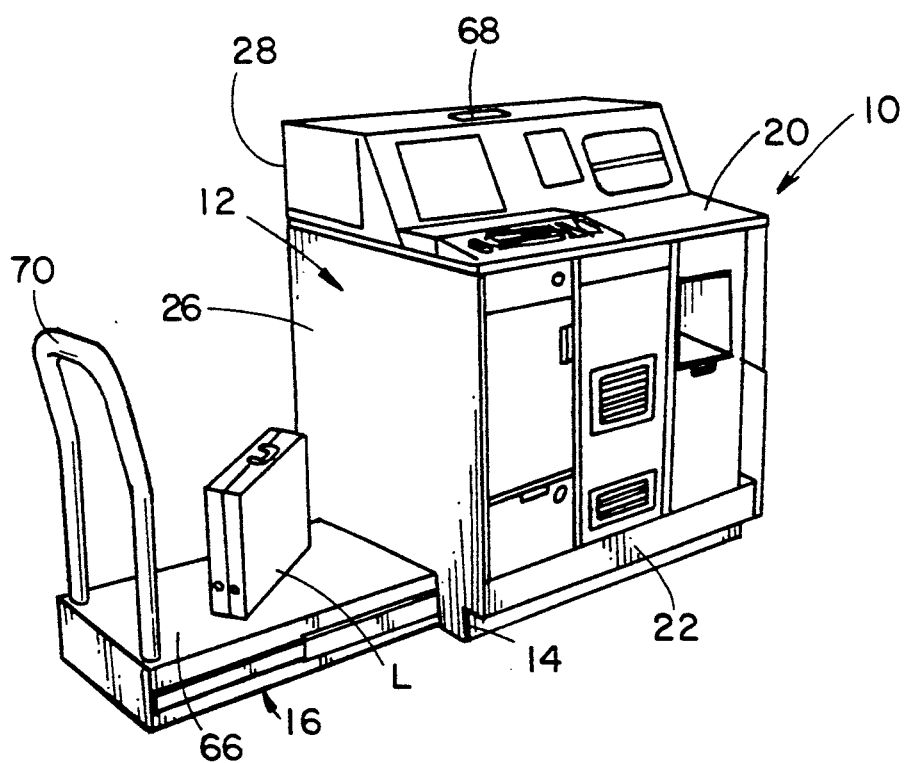
FIG. 1 is a perspective view of a portable curbside check-in counter embodying the present invention as seen from the agent's side.
Figure 2:
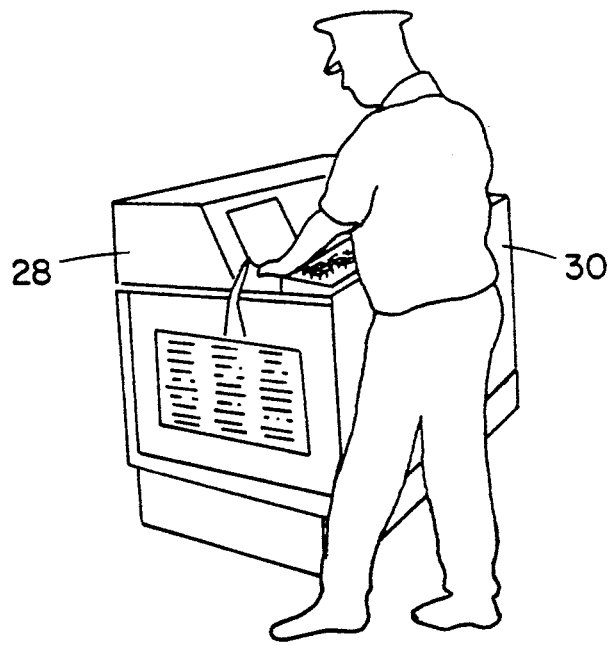
FIG. 2 is a perspective view showing the curbside check-in counter located outside a terminal building.
Figure 3:
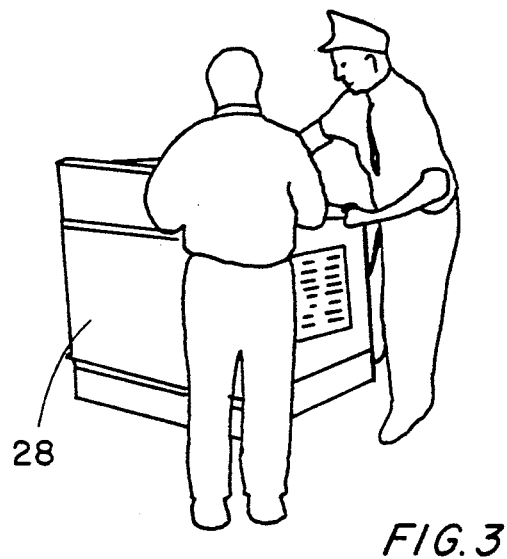
FIG. 3 is a perspective view showing the curbside check-in counter located inside a terminal building.

As shown in FIG. 1, the scale unit 16 includes a bed 66 on which items, such as luggage L, rest for weighing. The scale unit bed includes a weighing mechanism that is connected to a first readout located behind information screen window 50 whereby baggage weight is displayed to the ticket agent. The weighing mechanism is known, and the particular weighing mechanism is not part of the present invention, and thus will not be discussed herein. This weighing mechanism is connected to a computer located inside the cabinet in compartment $C_4$ (FIG. 7) on a adjustable shelf CSP to send weight data to that computer. The computer then uses this data to compute baggage limits and overweight charges that will be displayed on a display screen 67 located adjacent to the screen window 50. This data is also forwarded to a central computer in the terminal. The weight data is also displayed on a second readout 68 located on the turret 47 so the passenger can see the baggage weight. The scale is controlled by a control panel 69 located on the cabinet unit as is shown in FIG. 11. The control panel includes adjusting knobs K, readout unit R. If the scale is not desired, a blank plate B as shown in FIG. 4 can be mounted in the cabinet unit. The control knobs include an on/off knob, a pounds/kilograms knob, a scale zero knob and the like.

The scale unit further includes a handle 70 that is removably attached to the bed to move that bed from the FIG. 1 use position to a stored position beneath the cabinet unit. As shown in FIG. 9, the bed includes rollers 72 is supported on tracks, such as track 74.

Figure 10:
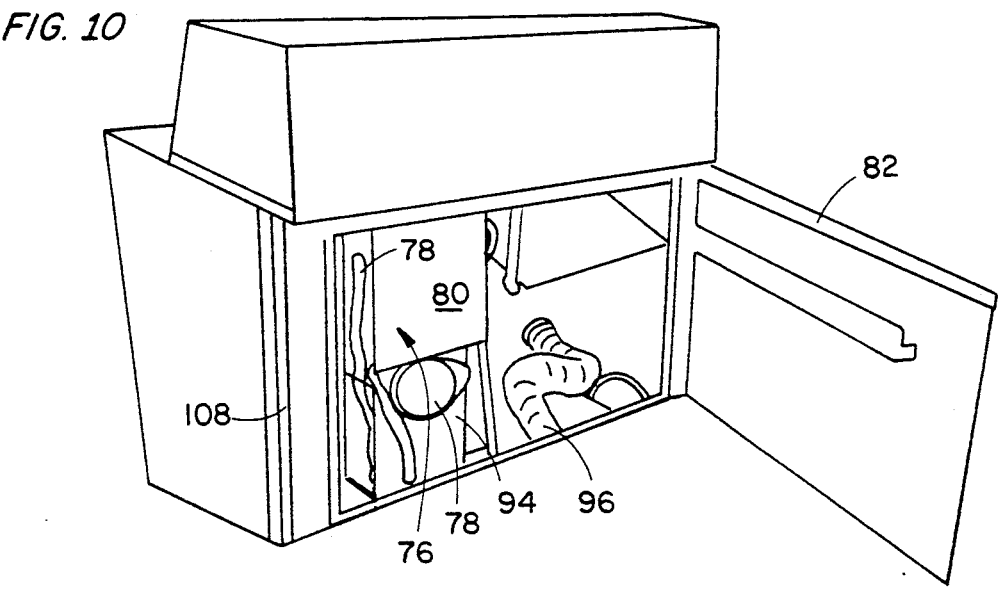
FIG. 10 illustrates the curbside check-in counter from the passenger's side with the panel open to show the heating and air conditioning unit.

The check-in counter cabinet unit further includes a control panel compartment 76 best shown in FIG. 10 in which an overall control panel unit is stored and is connected by leads, such as lead 78 to the computer unit, to the scale mechanism, to the monitors located beneath the turret and to a central computer in the terminal building. Power is supplied to the computer and to the various other components of the counter via power leads, such as lead 78. The cabinet unit includes an access door 80 to permit access to that control panel unit. The computer unit, itself, is known, and forms no part of the present invention, and thus will not be further discussed. The access door is covered by a cabinet door 82.

A printer unit 84 is indicated in FIG. 4 as being located in the cabinet in compartment $C_5$ (see FIG. 7) and rests on a paper storage drawer 90 shown in FIGS. 7 and 8. The printer receives paper from the storage drawer, and printed material is ejected from the printer out of the cabinet unit above the storage drawer. The printer unit has its own shield plate 91 to extend from the drawer 90 to just below the top of the cabinet. If the printer shield plate does not fill this space, a special filler plate can be attached to the cabinet unit. The printer can be a laser printer, and can be adapted to print tickets, baggage claim tags or the like. The baggage claim tags can be imprinted with a bar code that is also imprinted on the ticket whereby baggage identification is quite efficient.

The paper storage drawer 90 shown in FIG. 8 is mounted on the cabinet by rollers in tracks to move into and out of the cabinet as can be seen by comparing FIGS. 7 and 8. Ticket jackets are stored in containers 92 shown in FIG. 12 and dispensed through door 52 on the turret.

As is best shown in FIG. 10, the counter includes a heating and air conditioning means. This means is located in compartment 94 and is powered from the main power cord. The heating and air conditioning means also includes a condensate conduit 96 located inside the cabinet unit to fluidically connect the heating and air conditioning means to the outside of the cabinet unit. Condensate from the heating and air conditioning means is directed out of the cabinet. The heating and air conditioning unit includes an axial fan and appropriate filter elements, and is located in the cabinet. The heating and air conditioning means is known, and thus will not be discussed in detail. Thermostats are located inside of the cabinet and are connected to the heating and air conditioning means to maintain a set temperature inside of the cabinet unit. The thermostats are also connected to visible alarms, such as LEDs located on the outside of the cabinet to warn of an off-temperature condition in the cabinet. Audible alarms are also used to warn the operator of potential a/c trouble. The unit is self-condensing, in that evaporator coils will eliminate overflow even though an overflow tube is provided.

Figure 12:
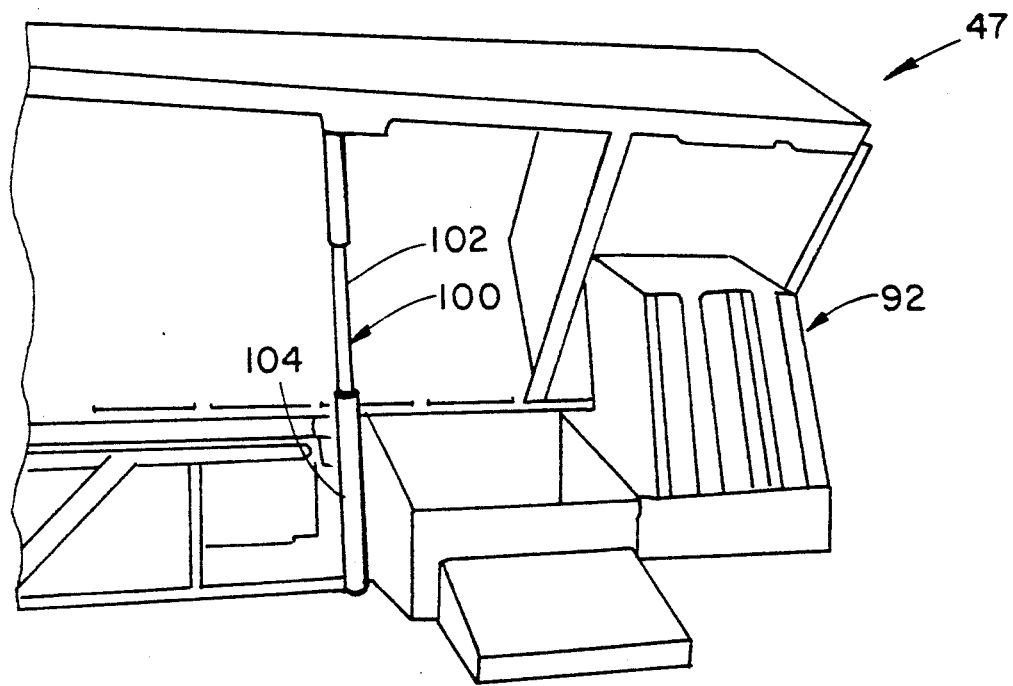
FIG. 12 illustrates the turret of the check-in counter in a raised condition.

As is best shown in FIG. 12, the turret 47 is hingeably mounted on the cabinet unit top to move between a closed position shown in FIG. 4 and an open position shown in FIG. 12. The turret includes a hydraulic lifting mechanism 100 that moves the turret. The lifting mechanism includes a telescoping leg 102 and a hydraulic cylinder element 104. The hydraulic cylinder and leg are known, and thus will not be discussed. These elements are operated by hand or by a motor located inside of the cabinet and controlled by a button located on the cabinet unit. The turret is locked in place by a lock 105.

The cabinet also includes bumper guards 106 as well as protective edge guards 108 to protect the cabinet from marring during use and storage. The cabinet unit is formed of weather-resistant material so it can be used curbside if necessary. The cabinet can also be moved on the wheel unit to various locations so the check-in counter can be positioned where it will be most effective.

Figure 13:
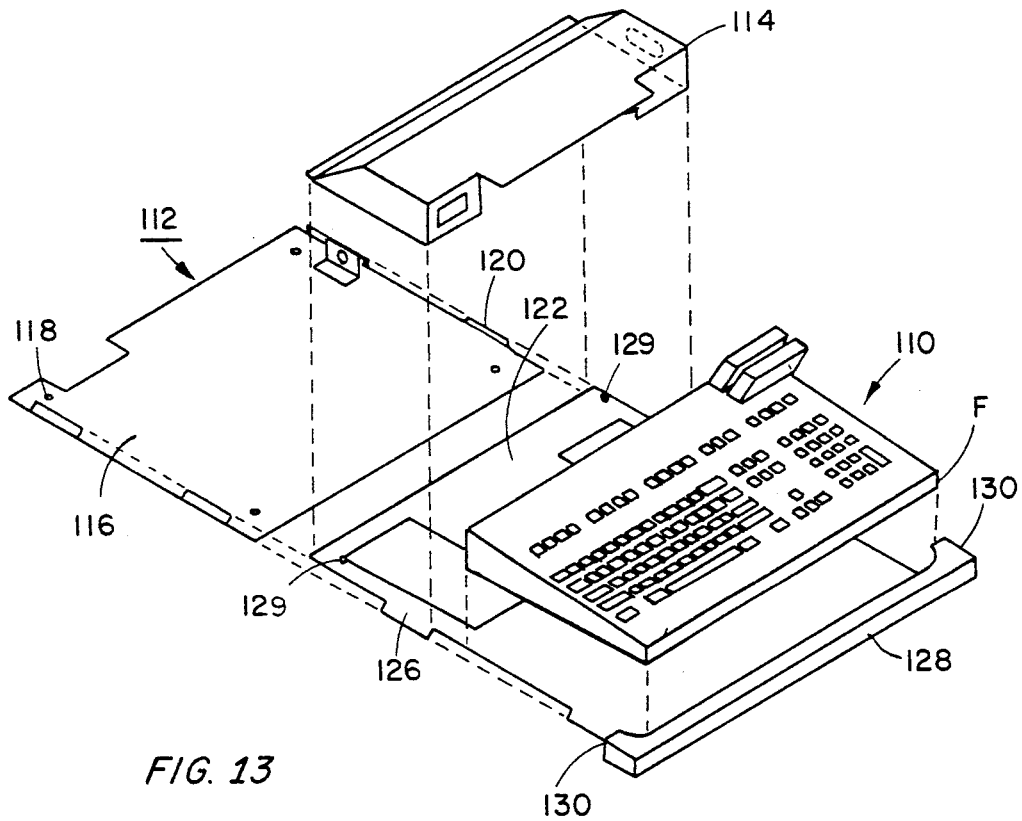
FIG. 13 is an exploded perspective view of a security device in combination with a keyboard.
Figure 14:
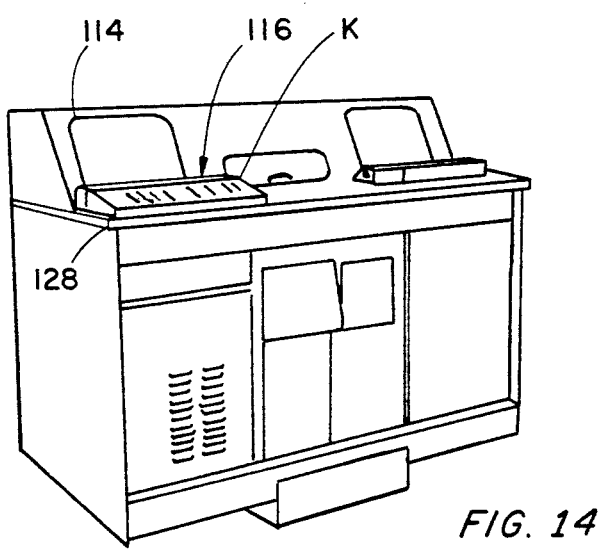
FIG. 14 illustrates the curbside check-in counter having the security device and keyboard mounted thereon.

The on/off switch S is connected to the computer and any keyboard associated with that computer. The switch is preferably key operated, but can be coded if desired. As is best shown in FIGS. 13 and 14, a keyboard 110 is located on the cabinet unit top 20 and is connected to the computer means. The keyboard is attached to the cabinet unit by a locking metal security device 112. The security device also includes a backstop/writing surface element 114 that fits over a portion of the keyboard, and is locked to maintain the keyboard attached to the cabinet unit. The security device 112 includes a base plate 116 that is fixed to the top surface of the cabinet by fasteners, such as self-taping screws, or the like (not shown) fitting through fastener-receiving holes, such as hole 118, in the plate. The plate has guide plates, such as guide plate 120 for a purpose that will be understood from the following disclosure. A mounting plate 122 is slidably mounted on the base plate 116 by means of the guide plates, and includes locking plates 126 that engage corresponding ribs in the writing surface element 114 to fix that surface to the base plate. A front locking bar 128 is integral with the plate 126 and is positioned to engage front end F of the keyboard 110. The plate 126 further includes two quarter-turn fasteners, such as Dzus fasteners 129, fixed thereto. The fasteners 129 lock the backstop/writing element to the plate 122.

The keyboard 110 is placed on the plate 122 to have the front end thereof engaged with the locking bar 128, the backstop/writing element is placed over the keyboard, and the plate 122 is inverted from the FIG. 13 position, and the backstop/writing element is attached thereto using the fasteners 129 to trap the keyboard thereon. The plate 122 is then slidably engaged with the plate 116 that has been fixed to the cabinet top surface.

Leads from the keyboard pass through weatherproof grommets on the cabinet to connect the keyboard to the computer and to the computer readout. The keyboard is weatherproof so it can be exposed to the weather without damage.

It is understood that while certain forms of the present invention have been illustrated and described herein, it is not to be limited to the specific forms or arrangements of parts described and shown.

I claim:

1. A portable check-in counter comprising:
   A) a cabinet unit having a top, a bottom first and second ends, a front and a rear, and further including
      (1) a wheel unit mounted on said cabinet unit bottom,
      (2) a plurality of access doors mounted on said cabinet unit,
      (3) a turret unit mounted on said cabinet unit top, said turret unit including a window for displaying a computer screen, a window for displaying flight information, and a storage compartment door on said turret unit,
      (4) a first scale readout on said cabinet unit;
   B) a scale unit including
      (1) a bed having a weighing mechanism therein,
      (2) mounting means slidably mounting said bed on said cabinet unit for sliding movement between a use position extending from said cabinet unit and a storage position within said cabinet,
      (3) lead means connecting said weighing mechanism to a computer located inside said cabinet unit;
   C) a printer compartment in said cabinet unit and including
      (1) a paper storage means, and
      (2) a compartment for storing a printer;
   D) a compartment for storing the computer in said cabinet unit;
   E) a compartment for storing heating and air conditionng means in said cabinet unit; and
   F) a compartment for storing an overall control panel in said cabinet unit.

2. The check-in counter defined in claim 1 wherein said cabinet unit further includes a check-in counter control panel compartment.

3. The check-in counter defined in claim 2 wherein said cabinet unit further includes a flight information control panel compartment.

4. The check-in counter defined in claim 3 wherein said cabinet unit further includes a weighing mechanism control panel compartment.

5. The check-in counter defined in claim 4 wherein said cabinet unit further includes a computer compartment which includes a computer supporting platform.

6. The check-in counter defined in claim 5 wherein said cabinet unit further includes a trash bin compartment.

7. The check-in counter defined in claim 6 wherein said cabinet unit further includes louvers on one of said access doors.

8. The check-in counter defined in claim 7 further including a slot defined in one of said access doors to connect said trash bin compartment to the outside of said cabinet unit.

9. The check-in counter defined in claim 7 wherein said cabinet unit further includes a kickplate on said bottom.

10. The check-in counter defined in claim 9 wherein said cabinet unit wheel unit further includes caster wheels mounted to rotate in two planes.

11. The check-in counter defined in claim 10 wherein said turret unit further includes hinge means connecting said turret unit to said cabinet unit top and means for pivoting said turret unit about said hinge means.

12. The check-in counter defined in claim 11 wherein said turret unit further includes a second scale readout.

13. The check-in counter defined in claim 12 further including a storage compartment in said turret unit.

14. The check-in counter defined in claim 1 wherein said scale unit further includes a handle releasably attached to said scale unit bed.

15. The check-in counter defined in claim 14 wherein said scale unit mounting means includes tracks attached to said cabinet unit bottom and rollers connecting said bed to said tracks.

16. The check-in counter defined in claim 15 further including keyboard mounting means for mounting a keyboard on said cabinet unit.

17. The check-in counter defined in claim 16 wherein said keyboard mounting means includes a security device having a backstop/writing element engaging the keyboard, a base plate, fastener means fixing said base plate to said cabinet unit, a mounting plate, releasably fastener elements attaching said mounting plate to said backstop/writing element and a bar element integral with said mounting plate, said bar element being positioned to engage a front end of said keyboard when said keyboard is located on said mounting plate.

18. The cheok-in counter defined in claim 1 wherein said printer compartment paper storage means includes a drawer having rollers and tracks mounted on said cabinet unit on which said rollers ride.

19. The check-in counter defined in claim 1 further including temperature sensors in said cabinet unit.

20. The check-in counter defined in claim 19 further including alarms connected to said temperature sensors.

21. The check-in counter defined in claim 1 further including an access door mounted on said cabinet unit rear.

22. The check-in counter defined in claim 21 further including protective edge guards on said cabinet unit.

23. The check-in counter defined in claim 1 wherein said cabinet unit, is formed of weather-resistant material.

24. The check-in counter defined in claim 23 wherein said material includes metal.

25. The check-in counter defined in claim 23 wherein said material includes fiberglass-type material.

26. The check-in counter defined in claim 23 wherein said material includes plastic-type material.

27. The check-in counter defined in claim 1 wherein said turret unit window is formed of non-glare glass.

28. The check-in counter defined in claim 1 further including a condensate conduit connected to said heating and air conditioning unit.

* * * * *